United States Patent [19]

Wiese

[11] Patent Number: 4,607,745

[45] Date of Patent: Aug. 26, 1986

[54] PENDULUM-MOUNTED BUCKET WITH CONTROL CAM FOR A BUCKET CONVEYOR

[75] Inventor: Hans-Holger Wiese, Burgwedel, Fed. Rep. of Germany

[73] Assignee: Hans-Holger Wiese GmbH & Co., Burgwedel, Fed. Rep. of Germany

[21] Appl. No.: 593,625

[22] Filed: Mar. 26, 1984

[30] Foreign Application Priority Data

Mar. 30, 1983 [DE] Fed. Rep. of Germany ....... 3311544

[51] Int. Cl.$^4$ .............................................. B65G 47/40
[52] U.S. Cl. .................................................. 198/706
[58] Field of Search ................................. 198/706, 802

[56] References Cited

U.S. PATENT DOCUMENTS

| 658,656 | 9/1900 | Le Grand | 198/706 |
| 709,203 | 9/1902 | Clarke | 198/706 |
| 765,068 | 7/1904 | Dodge | 198/706 |
| 3,381,796 | 5/1968 | Gregor | 198/706 |

FOREIGN PATENT DOCUMENTS 2546748 8/1981 Fed. Rep. of Germany.

Primary Examiner—Joseph E. Valenza
Assistant Examiner—D. Glenn Dayoan
Attorney, Agent, or Firm—Peter K. Kontler

[57] ABSTRACT

A bucket conveyor wherein the buckets are pivotable about transverse horizontal axes and have first cam faces which slope upwardly and rearwardly counter to the direction of movement of the buckets. The cam faces of successive buckets can be engaged by a roller which can be moved downwardly to tilt the buckets. The buckets have straight second cam faces which come into contact with the underside of a stationary rail in response to partial tilting of the buckets to maintain the buckets in tilted positions during travel along a selected portion of their path. The downstream end of the rail forms a ramp to effect a gradual pivoting of successive buckets back to untilted positions.

7 Claims, 4 Drawing Figures

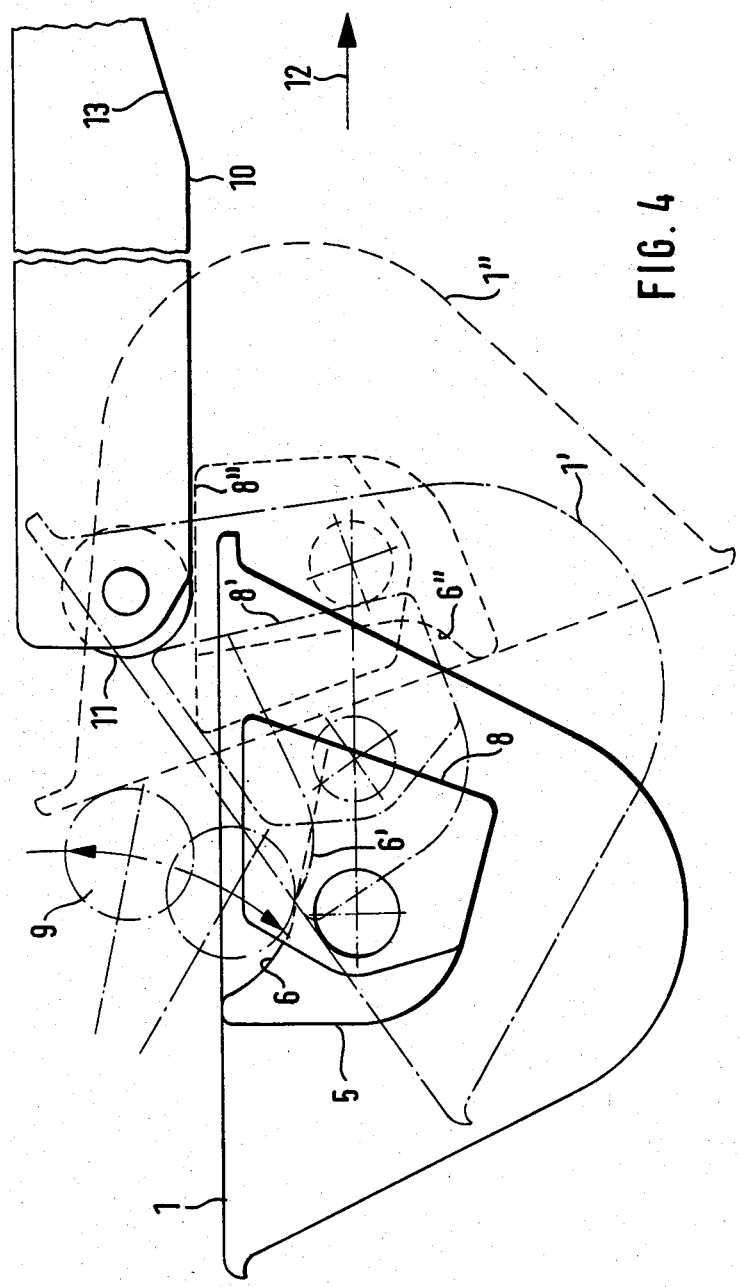

PENDULUM-MOUNTED BUCKET WITH CONTROL CAM FOR A BUCKET CONVEYOR

The invention relates to the bucket of a bucket conveyor with two lateral traction elements, between which the bucket is pendulum-mounted with an axis arranged transversely to the conveying direction and exhibits a laterally arranged cam face and an associated retaining part which is engaged by a stationary control member pivotable into the movement path of the bucket in order to tip the bucket.

A pendulum bucket conveyor with continuous traction elements is known from German Pat. No. 2,546,748, the buckets of which are equipped with lateral control cams which extend from a point radially remote from the pendulum axis and located in front of and above the pendulum axis in the conveying direction of the bucket obliquely downwards towards the pendulum axis. Such a cam is intended to be engaged by a control roller in order to make the bucket tip. Any abrupt collision of parts is intended to be avoided by the shape of the control cam. However, this aim cannot always be adequately fulfilled by the solution disclosed. Furthermore, in the tipped position of the bucket the control cam rubs with its radially outer region along the underside of a retaining rail, whereby it is intended to be ensured that after the initial tipping of the bucket the latter does not swing back immediately into its initial position and terminate the discharge process prematurely. Particularly in the case of transporting material with strongly corrosive properties, the continual rubbing of the control cam along the underside of the retaining rail leads to premature abrasion and to an undesirable modification of the shape of the control cam.

The underlying aim of the invention is to conform the cam face of the bucket so that a virtually impact and vibration-free initiation of the tipping movement of the bucket can be achieved and furthermore any premature abrasion of the cam face can be avoided. According to the solution of the invention, the cam face extends in the conveying direction from a point in front of the pendulum axis with a slope upwards and rearwards.

The cam face is preferably constructed with its front part as a straight line of constant slope, which merges into a rear part provided with an increasing slope. The slope of the front part may be approximately 10°. A virtually impact and vibration-free entry is achieved by this means. At the initial tipping of the bucket the control member, being pivoted into the movement path of the bucket, runs along with rolling friction on the cam face. The cam face undergoes a substantially vertical alignment as far as the limit position and does not come into contact with the retaining rail which ensures longer maintenance of the bucket in the tipped position. The advantage of a very slight, virtually negligible abrasion, is therefore achieved simultaneously by the alignment of the cam face.

The retaining part which ensures the maintenance of a tipped position for a long period may be arranged either laterally staggered relative to the cam face on the same side of the bucket, or else on the opposite side of the bucket to the cam face. Because it is subject to higher wear, exchangeability is advantageously ensured by a detachable fastening.

An example of construction of the invention is illustrated purely diagrammatically in the drawing and described below. In the drawing:

FIG. 4 shows the cycle of a tipping movement.

Figure 2:
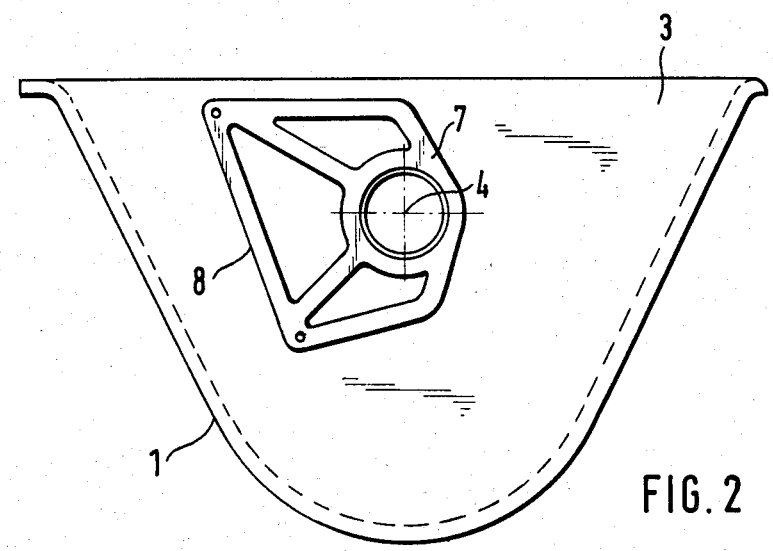
FIG. 2 shows the side elevation of a bucket with retaining cam.
Figure 1:
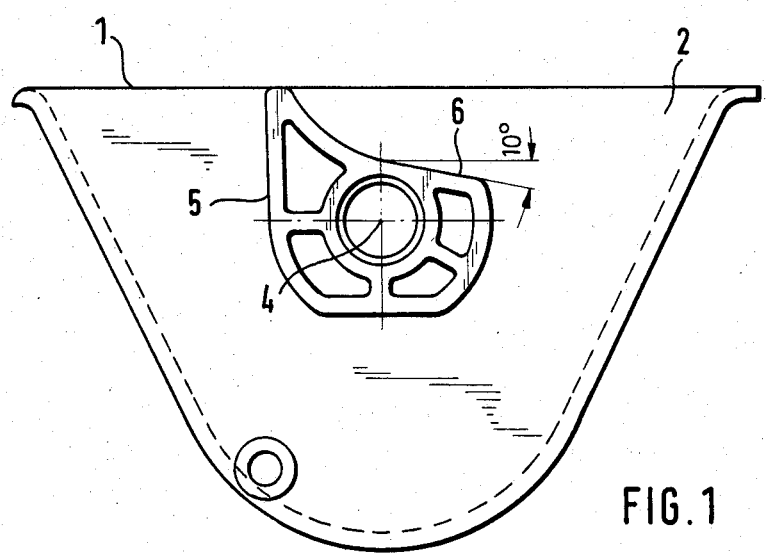
FIG. 1 shows the side elevation of a bucket with a plan of the cam face.
Figure 3:
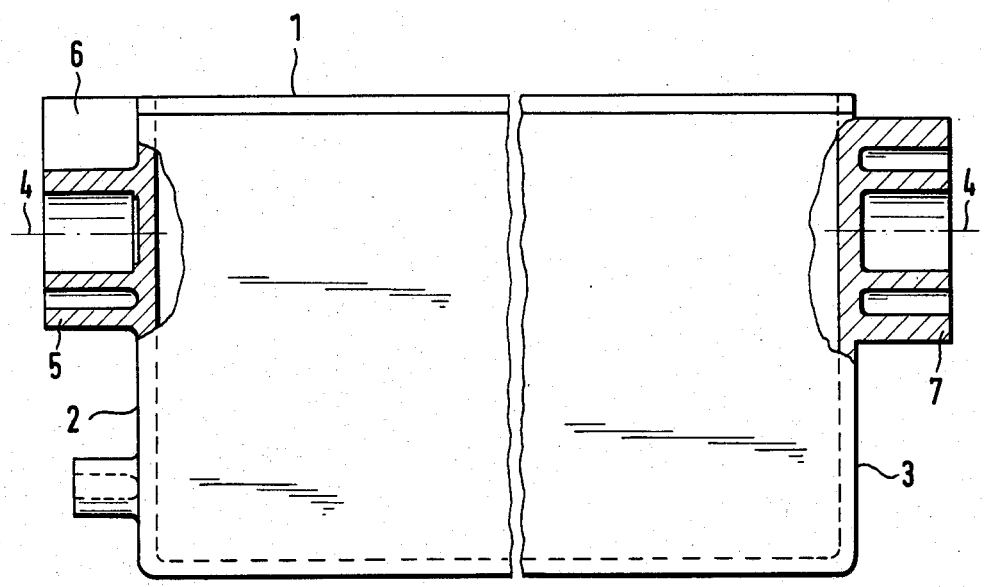
FIG. 3 shows the plan of the longitudinal side of the bucket according to FIGS. 1 and 2 located in front in the conveying direction.

The trough-shaped bucket 1 is suspended pendulum-fashion at its two lateral surfaces 2 and 3. The pendulum axis is designated 4. The control plate 5, which is worked integrally with the lateral face 2, is constructed as a lateral projection. It exhibits at its top side the cam face 6, which is constructed with its front entry part as a straight line with a slope angle of approximately 10°. The rear half of the cam face in the conveying direction is provided with an increasing slope. By this means a horizontal-tangential entry is ensured initially with a tipping or tilting moment which increases continually rising to the tipped final position of the bucket. The lateral surface 3 opposite the lateral surface 2 shows, in the example illustrated, the arrangement of a further cam body 7 with a cam face 8 constructed as a straight line.

In order to initiate the tipping movement, the control member, in the form of a control roller 9 in the example shown, is pivoted into the movement path of the conveyor bucket 1. The retaining rail 10 serves to fix the tipped limit position of the conveyor bucket for a required period by the abutment of the straight cam face 8 against its underside (FIG. 4). A transfer roller 11, which is arranged at the entry edge or upstream end of the retaining rail 10, ensures a gentle and low-friction transfer of the cam face 8 as far as its abutment against the underside of the retaining rail 10.

In its basic position, the conveyor bucket 1 occupies the position shown on the left-hand side of FIG. 4 until the control roller 9 enters its movement path. When the roller 9 comes into contact with the cam face 6, as soon as it has reached the center point of the latter vertically above the pendulum axis, it ensures a tipping movement of the bucket, the limit position of which, when the top end of the cam face 6 is reached, is designated 1'. At this moment the cam face 8 comes into contact by its upwardly directed edge with the transfer roller 11. Due to the further progressive movement in the direction of the arrow 12, the further tipping movement is now effected by the cam face 8, which under the influence of the retaining rail 10 tips the bucket until the cam face 8 comes into abutment against the underside of the retaining rail 10 in the position designated 1''. This is the extreme tipped position of the bucket. As soon as the bucket has left the retaining rail 10, it can swing back into its original position. The ramp 13 at the rear end of the retaining rail 10 ensures an initially gradual return of the bucket into its original position, in order to prevent the bucket from executing a protracted pendulum oscillation by dropping abruptly back into its initial position.

An extremely gentle, impact and vibration-free initial tipping of the bucket as far as its limit position is ensured by the virtually horizontal-tangential entry of the control roller 9 into engagement with the cam face 6. The operation is effected equally quietly without abrupt pivoting back by the ramp 13 at the end of the retaining rail 10.

I claim:

1. In a bucket conveyor with two lateral traction elements, a bucket which is pendulum-mounted between the traction elements for translatory movement in a conveying direction and for pivotal movement about an axis extending transversely of said conveying direction, said bucket having a first cam face which extends counter to said conveying direction and slopes upwardly and rearwardly from a point ahead of said axis, as considered in said conveying direction; a cam provided on said bucket and having a substantially straight second cam face; a control member adjacent to the path of movement of the bucket and movable downwardly into engagement with said first cam face to thereby tilt the bucket as a result of movement of said first cam face relative to said control member; and a stationary retaining member adjacent to the path of movement of said bucket downstream of said control member to be engaged by said second cam face upon at least partial tilting of the bucket by said control member, said retaining member including a roller at the upstream end of said second cam face.

2. The structure of claim 1, wherein said first cam face includes a substantially straight front part and a rear part whose slope exceeds the slope of said front part.

3. The structure of claim 2, wherein the slope of the front part of said cam face is approximately 10 degrees.

4. The structure of claim 1, wherein the entire cam face of said bucket is located at a level above said axis in the untilted position of said bucket.

5. The structure of claim 1, wherein said cam faces are disposed at the opposite sides of said bucket.

6. The structure of claim 1, wherein said cam is detachable from said bucket.

7. The structure of claim 1, wherein said retaining member has a ramp at the downstream end thereof to effect gradual pivoting of the bucket back to the untilted position.

* * * * *